J. RIAL.
MOLDING DEVICE.
APPLICATION FILED OCT. 15, 1909.
971,407.
Patented Sept. 27, 1910.
2 SHEETS—SHEET 1.
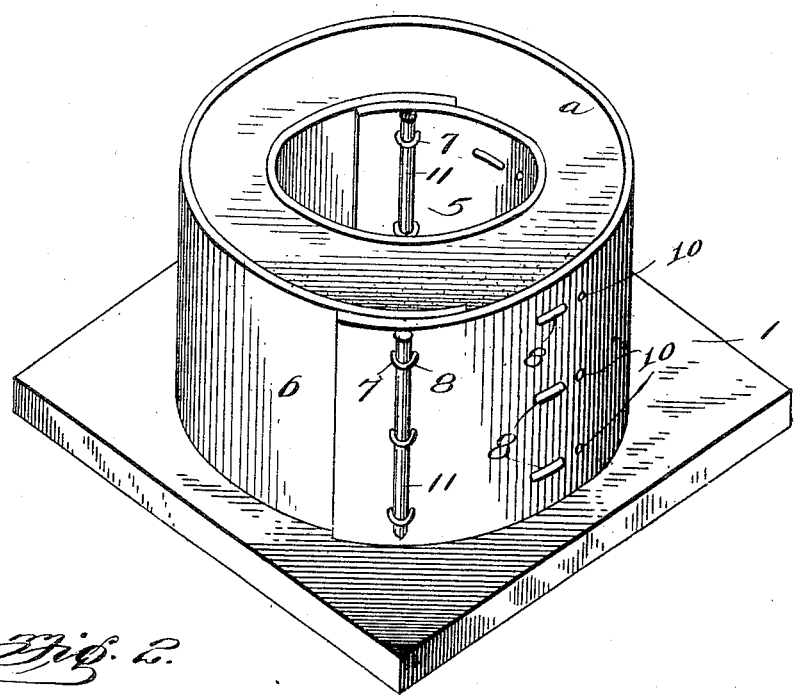
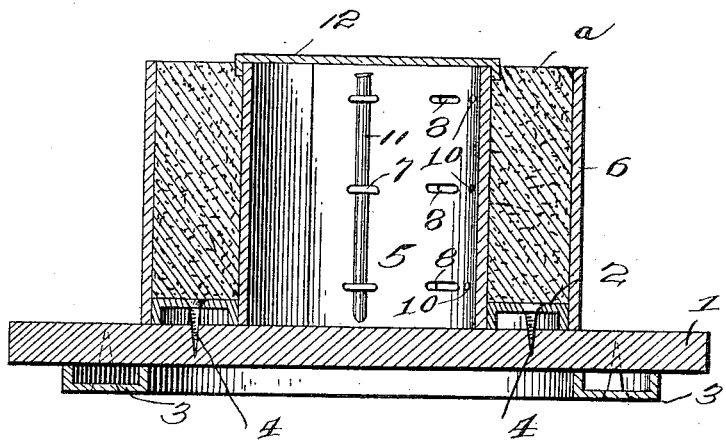

J. RIAL.
MOLDING DEVICE.
APPLICATION FILED OCT. 15, 1909.

971,407.

Patented Sept. 27, 1910.

2 SHEETS—SHEET 2.

Witnesses

Inventor
John Rial.
By Victor J. Evans
Attorney

UNITED STATES PATENT OFFICE.

JOHN RIAL, OF BRENHAM, TEXAS.

MOLDING DEVICE.

971,407. Specification of Letters Patent. Patented Sept. 27, 1910.

Application filed October 15, 1909. Serial No. 522,779.

*To all whom it may concern:*

Be it known that I, JOHN RIAL, a citizen of the United States, residing at Brenham, in the county of Washington and State of Texas, have invented new and useful Improvements in Molding Devices, of which the following is a specification.

This invention relates to improvements in molds for molding concrete pipe and other similar articles, the object of the invention being to provide an improved mold of this character embodying cylindrical or substantially cylindrical flexible walls having end portions disposed in overlapped relation so that said walls are rendered adjustable diametrically and the mold adapted to use in molding pipe of varying diameters.

A further object of the invention is to effect improvements in the construction of the diametrically adjustable wall elements of the mold and in the means for securing the overlapping ends of said diametrically adjustable flexible wall elements together in adjusted position.

The invention consists in the construction, combination and arrangement of devices hereinafter described and claimed.

Figure 3:
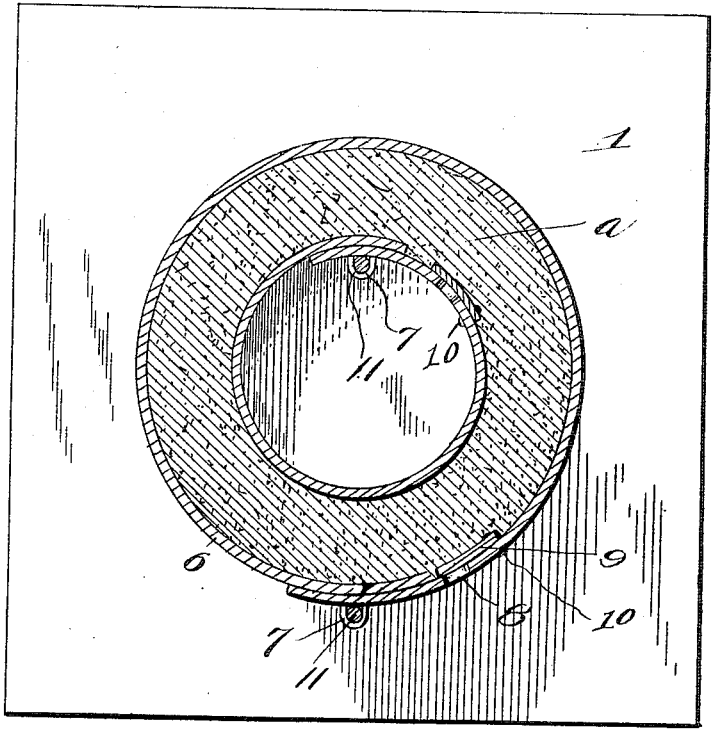
Figure 4:
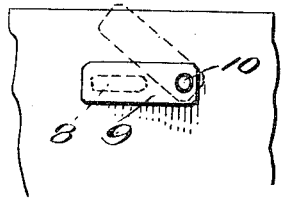

In the accompanying drawings:—Figure 1 is a perspective view of a mold constructed in accordance with my invention with the cap of the inner wall removed. Fig. 2 is a vertical central sectional view of the same. Fig. 3 is a horizontal sectional view of the same. Fig. 4 is a detail elevation, showing one portion of one of the diametrically adjustable walls and a closure thereon for closing one of the adjusting openings.

In the embodiment of the invention here shown, there is employed a pallet board 1 which is provided on opposite sides with annular heads 2 and 3 of different diameters. The heads are here shown as made of channeled sheet metal and secured to the pallet board by means of screws 4.

Inner and outer flexible diametrically adjustable substantially cylindrical mold walls 5—6 are employed which are made of suitable sheet metal. Each of the said walls is open at one side and provided with overlapping ends so that the said walls are adapted to be diametrically adjusted and, hence, the mold may be employed for molding concrete pipe or the like of different diameters. Each of the said mold walls is provided at one end with keeper staples 7 and at various distances from the other end with adjusting openings 8 adapted for the reception of the said keeper staples so that by overlapping the ends of the walls to any desired extent and causing the keeper staples to be engaged with appropriate adjusting openings, the diameters of the mold walls may be varied as may be required according to the diameter of the concrete pipe sections which it is desired to form in the mold. The said flexible mold walls are provided with closures 9 for the adjusting openings, the said closures being here shown as pivoted as at 10 so that they may be disposed over the said openings or moved to one side thereof to permit the insertion of the keeper staples in said openings. Pins 11 are employed which are adapted to be placed in the keeper staples to bear on the overlapping ends of the mold walls and co-act with said keeper staples in securing the mold walls in any desired adjusted position.

The smaller mold wall is placed on the pallet board and within the appropriate head 2 or 3 to bear against the inner side of the said head and the outer or larger mold wall is placed on the pallet board and adjusted so as to fit on the outer side of said head, the latter serving to appropriately space the mold walls apart and to adapt the mold walls to receive the concrete in a plastic condition between them so as to form a length or section of concrete pipe. The concrete in the act of being molded is indicated at "a" in the drawings. A cap 12 is provided to fit on the upper end of the inner wall 5, said cap being here shown as having a downturned flange to engage said inner wall and keep said cap in place thereon. Said cap when the concrete is being placed in the mold space between the mold wall prevents any of the concrete from getting inside the inner mold wall. Such openings 8 as here exposed in the mold walls are covered by the closures 9 to prevent concrete from passing out through said openings. By providing the pallet with a suitable number of heads of different diameters and by making the mold walls of suitable size, the mold may be adapted for use in molding concrete pipe sections or the like of the desired size so that one mold may be used for a variety of sizes of pipe.

Having thus described the invention, what is claimed, is:—

In a mold of the character described, a pair of spaced flexible walls each formed from a single piece of material and each wall having one of its ends formed to provide spaced vertical series of passages and having its opposite end provided with staples for interchangeable engagement in the said series of passages, pivoted closures carried by each wall and located adjacent to the innermost passages therein, a keeper rod extending through the said staples to hold the wall ends against separation, and a base member formed on its opposite sides for interchangeable engagement with the said walls and provided with outstanding head portions fitting between the walls to hold them spaced from each other.

In testimony whereof I affix my signature in presence of two witnesses.

JOHN RIAL.

Witnesses:
A. C. DERER,
WILL RIAL.